United States Patent Office 3,066,788
Patented Dec. 4, 1962

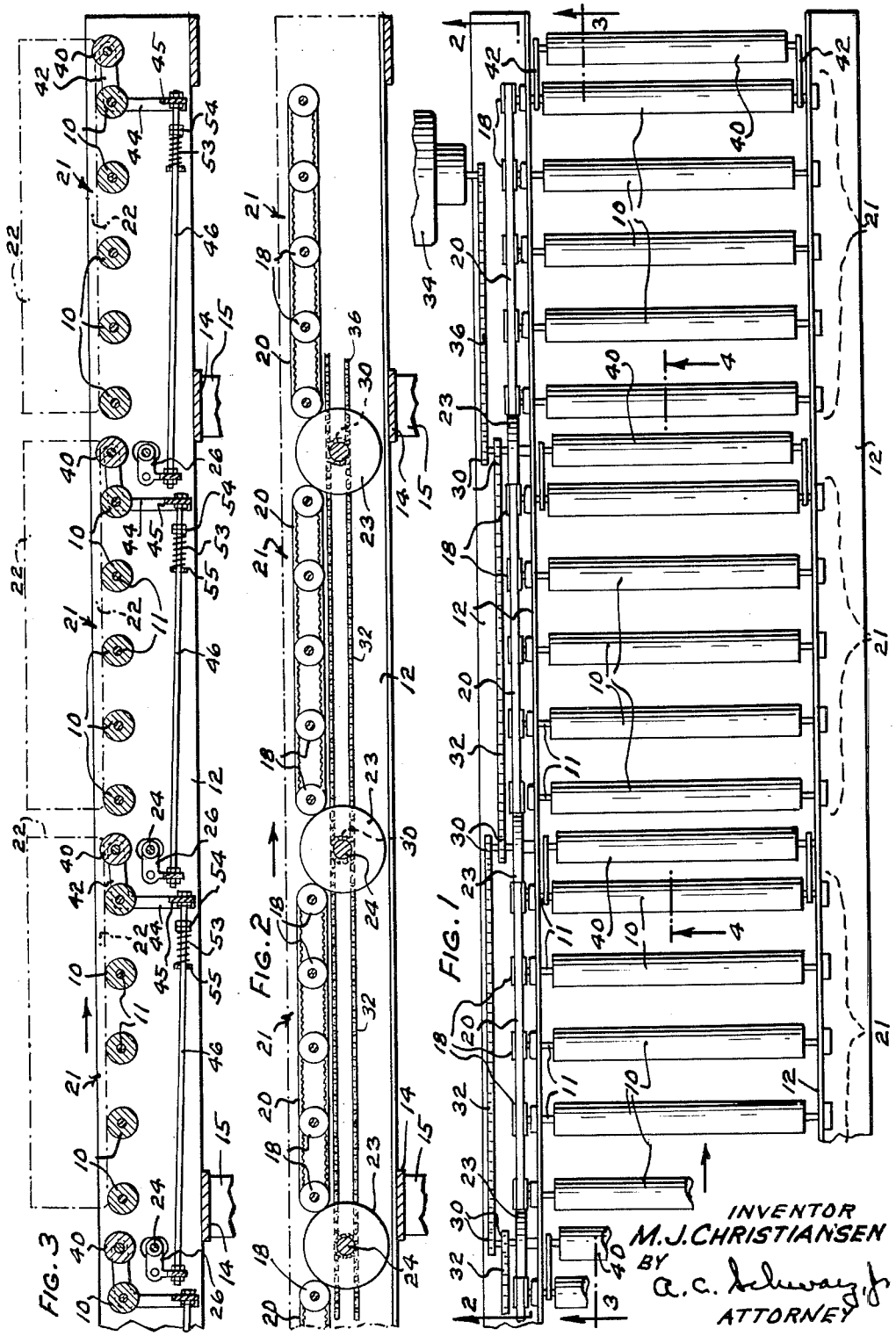

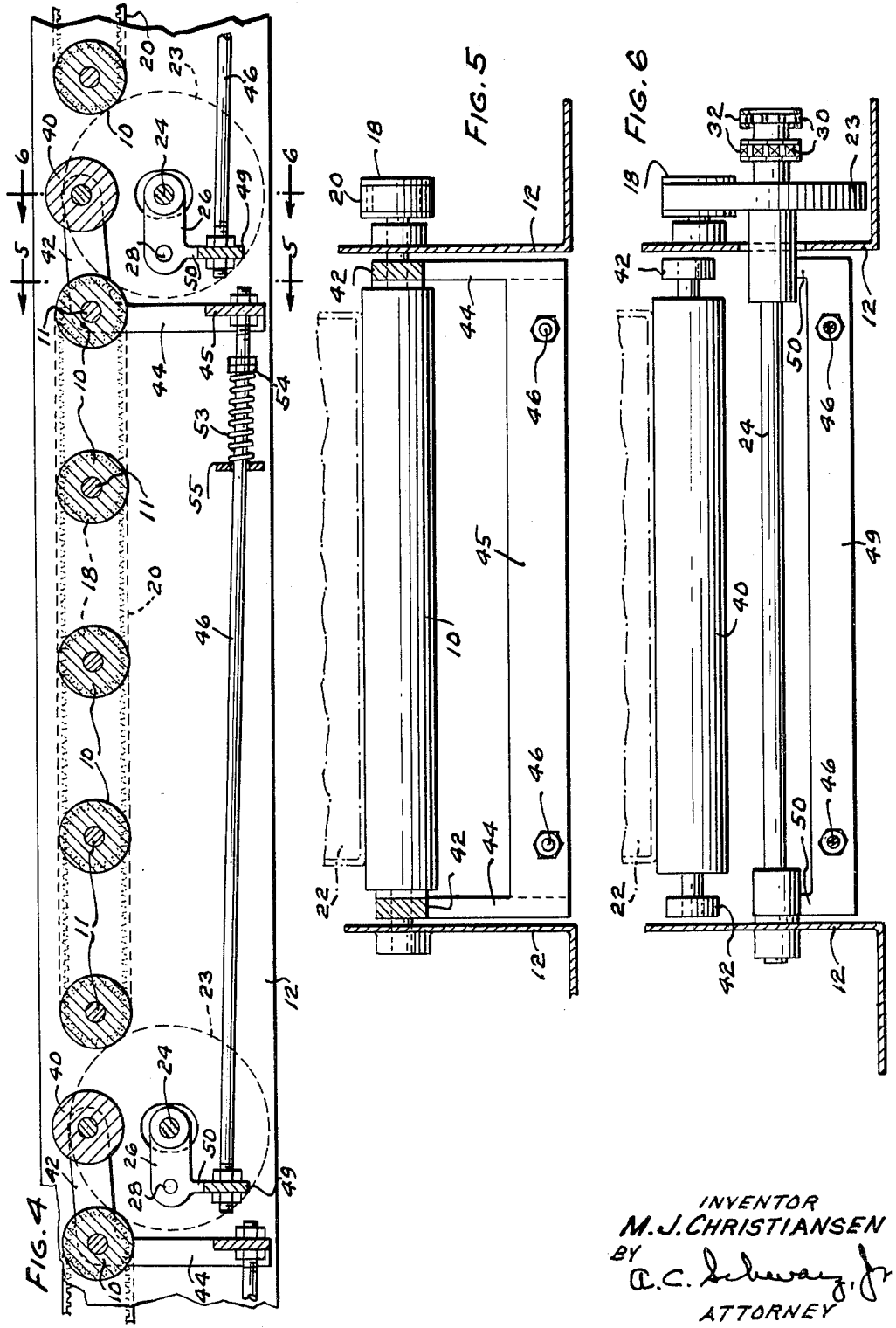

3,066,788
APPARATUS FOR ADVANCING ARTICLES
Milton J. Christiansen, Brookfield, Ill., assignor to Western Electric Company, Incorporated, New York, N.Y., a corporation of New York
Filed Aug. 25, 1960, Ser. No. 51,873
9 Claims. (Cl. 198—34)

This invention relates to an apparatus for advancing articles, and more particularly to article advancing apparatus having a plurality of power-driven conveyor units.

With one type of conveyor for advancing articles along a predetermined path to a delivery station, the conveyor is continuously operated and the articles are applied thereto in spaced relation to each other and are conveyed thereby to the delivery station where the movement of the first article is arrested by engagement with a stop. As successive articles are advanced to the delivery station and into engagement with the preceding articles, the pressure applied to the first article is progressively increased and may reach a point where it is extremely difficult to remove the article from the conveyor.

An object of the present invention is to provide an improved apparatus for advancing articles.

Another object of the invention is to provide an improved apparatus for conveying articles along a predetermined path and for preventing the engagement of the articles and the build up of undesirable pressures therebetween as they accumulate on the delivery end of the apparatus.

Another object of the invention is to provide an article advancing apparatus having a plurality of power operated conveyor units with mechanism therefor actuated by the articles being conveyed for controlling the operation of the conveyor units.

With these and other objects in view, the invention contemplates the provision of an apparatus for advancing articles consisting of a plurality of conveyor units mounted in a line in adjacent relation to one another for advancing articles thereon along a predetermined path. Power-operated drive wheels individual to the conveyor units are urged into engagement with the trailing end of the conveyor unit associated therewith and the leading end of the preceding conveyor unit for driving them. Control rollers individual to the conveyor unit and disposed adjacent the leading ends thereof at a level slightly above the conveyor units are each operatively connected to the drive wheel associated with a conveyor unit so that when an article is advanced onto the foremost conveyor unit, the control roller is depressed and serves to disengage the drive wheel from the first and second conveyor units.

As successive articles are advanced they ride onto and render successive conveyor units unoperative in the same manner. When the article on the first conveyor unit is removed, the first drive wheel is rendered effective to actuate the first and second conveyor units resulting in the advancement of the second article onto the first conveyor unit. In a like manner, the removal of the articles from successive conveyor units serves to render such conveyor units effective to actuate the preceding conveyor unit and advance the article therefrom onto the following conveyor unit.

Other objects, advantages and novel aspects of the invention will become apparent upon consideration of the following detailed description in conjunction with the accompanying drawings, wherein:

FIG. 1 is a plan view of an article conveying apparatus embodying the present invention;

FIGS. 2 and 3 are longitudinal vertical sectional views of the apparatus taken on the lines 2—2 and 3—3 of FIG. 1;

FIG. 4 is an enlarged vertical longitudinal sectional view of the apparatus taken on line 4—4 of FIG. 1; and FIGS. 5 and 6 are vertical cross-sectional views of the apparatus taken along lines 5—5 and 6—6 of FIG. 4.

Referring to the drawings, the article advancing apparatus or conveyor comprises a plurality of feed-rollers 10 fixed to shafts 11 which are rotatably supported in a pair of side frame members 12. The side frame members 12 are mounted in spaced relation to each other on cross frame members 14 (FIGS. 2 and 3) which in turn are supported on suitable legs 15. The feed rollers 10 are arranged in groups of a predetermined number of rollers in each group, five being shown herein, and with the rollers of each group interconnected to each other by pulleys 18 on the shafts 11 and timing belts 20. The pulleys and belts have intermeshing teeth thereon for positively rotating the feed rollers 10 in synchronism with each other.

Each group of feed rollers 10 comprises a conveyor unit 21 which is normally driven in synchronism with the other conveyor units for advancing articles such as tote pans 22 along a predetermined path, and each of which is capable of being rendered unoperative to arrest the movement of the article thereon.

Drive wheels 23 individual to each of the conveyor units 21 are fixed to drive shafts 24 and are movable into engagement with the trailing end of the timing belt 20 of its conveyor unit 21 and into engagement with the leading end of the timing belt 20 of the preceding conveyor unit 21 for driving both conveyor units. The shafts 24 are rotatably supported in the ends of bell crank levers 26 which are pivotally mounted at 28 on the side frames 12 for oscillatory movement. Sprockets 30 (FIGS. 1 and 6) on the ends of the shafts 24 are interconnected by chains 32 for connecting the shafts together for simultaneous rotation. A motor 34 is connected through a chain and sprocket connection 36 to one of the shafts 24 for imparting rotation to the drive wheels 23.

Mechanism is provided for each of the conveyor units 21 for disengaging the drive wheel 23 from the driving belts of the adjacent conveyor unit 21 to render the conveyor unit associated therewith unoperative in response to movement of an article into a predetermined position on the conveyor unit. This mechanism includes a control element in the form of a roller 40 for each conveyor unit 21, the roller 40 being rotatably mounted on the ends of a pair of bell cranks 42 and positioned adjacent the leading end of the associated conveyor unit 21 at a level slightly above that of the feed rollers 10. The bell cranks 42 are pivotally supported on the shaft 11 of the leading feed roller 10 of the conveyor section 21 and have depending arms 44 interconnected at their lower ends by a cross arm 45. The bell cranks 42 and the bell cranks 26 are linked together by means of a pair of rods 46, which at one end are pivotally attached to the cross arm 45 of the bell crank 42 and at the other end are pivotally connected to a cross bar 49 extending between and secured to the depending arms 50 of the bell cranks 26.

Springs 53 interposed between adjusting nuts 54 on the rods 46 and a fixed cross bar 55 extending between the side frames 12 stress the rods 46 for movement in one direction to rock the bell cranks 26 and 42 about their pivots in a counterclockwise direction as viewed in FIG. 4 to move and normally maintain the drive wheel 23 in engagement with the timing belt 20 of the conveyor unit 21 associated therewith and the preceding conveyor unit and to yieldably maintain the control roller 40 in its normal upper position at an elevation slightly above the feed rollers 10.

In response to movement of an article 22 onto a conveyor unit 21 and onto the control roller 40, the roller 40 is depressed, thereby effecting the oscillation of the bell cranks 42 and 26 in a clockwise direction and the disengagement of the driving wheel 23 from the timing belts 20 of the conveyor unit 21 associated therewith and the conveyor unit adjacent thereto to render unoperative the conveyor unit 21 associated therewith.

In the operation of the apparatus, an article 22 placed on the conveyor will be advanced to the right as viewed in FIGS. 1 and 3 by successive conveyor units 21, it being understood that each of the intermediate conveyor units 21 is driven by the drive wheel 23 associated therewith and engaging the trailing end thereof and is driven by a second drive wheel 23 of the following conveyor unit 21 engaging the leading end thereof. Only the first conveyor unit 21 at the delivery end of the conveyor is driven by a single drive wheel 23 engaging the trailing end thereof.

As the article is advanced onto an intermediate conveyor unit 21 and onto the control roller 40 thereof, the roller 40 will be depressed and will effect the disengagement of the drive wheel 23 associated therewith from the trailing end of the conveyor. However, the conveyor unit will continue to be actuated to advance the article therefrom onto the following conveyor unit by means of the drive wheel 23 of the following conveyor unit, which drive wheel engages the leading end of the conveyor unit. The article is advanced by successive conveyor units 21 onto the foremost conveyor unit where it rides onto and depresses the control roller 40, which effects the disengagement of the drive wheel 23 associated therewith and renders this conveyor unit unoperative inasmuch as it does not have a second drive wheel 23 engaging the leading end thereof for actuating it.

A second article 22 applied to the conveyor will be advanced along successive conveyor units in the same manner until it reaches the second conveyor unit 21, and as the article rides on and depresses the control roller 40 of the second conveyor unit 21, it effects the disengagement of the drive wheel 23 from the trailing end of the second conveyor unit and renders it unoperative. This arrests the forward movement of the second article positioned on the second conveyor unit 21. As successive articles are advanced, they ride onto and render successive conveyor units unoperative in the same manner.

When the article 22 on the first conveyor unit 21 at the delivery end of the conveyor is removed, the drive wheel 23 associated with the first conveyor unit is rendered effective to actuate the first and second conveyor units to cause the article on the second conveyor unit 21 to be advanced onto the first conveyor unit 21 and the release roller 40 thereof, thereby effecting the retraction of the first drive wheel 23 and rendering the first conveyor unit 21 unoperative. With the removal of the article from the second conveyor unit 21, the drive wheel 23 associated therewith is rendered effective to drive the second and third conveyor units. This causes the article to be advanced from the third conveyor unit onto the second conveyor unit, thereby rendering the second conveyor unit unoperative and rendering the third conveyor unit operative. As successive conveyor units are rendered operative, each actuates the preceding conveyor unit and effects the advancement of an article from the preceding conveyor unit if an article is supported thereon.

Although the drive mechanism for actuating each of the conveyor units 21 and the conveyor units 21 adjacent and preceding them is in the form of drive wheels 40 movable into and out of engagement with the timing belts 20 of the adjacent conveyor units 21 under control of a control element in the form of rollers 40 for rendering the conveyor section operative or unoperative, it will be understood that the drive mechanism for the conveyor units may take other forms and that the control element therefor may take other forms and may be located in other positions relative to the conveyor units without departing from the spirit of the invention.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Article conveying apparatus, comprising a plurality of conveyors, means for mounting the conveyors in adjacent relation one to another for conveying articles along a predetermined path, drive means individual to said conveyors for actuating each of said conveyors and the adjacent preceding conveyor, control elements individual to said conveyors mounted in the path of movement of the article for actuation thereby when the article reaches a predetermined position on said conveyor, and means responsive to the actuation of said control element for rendering the drive means associated with said conveyor unoperative.

2. Article conveying apparatus, comprising a plurality of rollers, frame means for rotatably supporting said rollers in a row in laterally spaced relation to each other, means for interconnecting the rollers of successive groups of rollers for rotation together to form a plurality of conveyor units in adjacent relation one to another for conveying articles thereon along a predetermined path, drive wheels individual to said conveyor units mounted on said frame means for movement to a normal operative position in engagement with the conveyor unit associated therewith and with the preceding conveyor unit and movable to an unoperative position disengaged from said conveyor units, means for continuously rotating said drive wheels to actuate said conveyor units, and control elements individual to said conveyor units and each operatively connected to the drive wheel associated with the conveyor unit and mounted on said frame means adjacent said conveyor unit for movement to a normal first position in the path of movement of the article for actuation thereby to a second position for moving said drive wheel to the unoperative position.

3. Apparatus for conveying articles comprising a plurality of rollers, frame means for rotatably supporting said rollers in a row in laterally spaced relation to each other, means for interconnecting the rollers of successive groups of rollers for rotation together to form a plurality of conveyor units in adjacent relation one to another, drive wheels individual to said conveyor units, means on said frame means for supporting each of said drive wheels for movement to a first position in engagement with the conveyor unit associated therewith and the preceding conveyor unit and to a second position disengaged from said conveyor units, a control element for each of said conveyor units mounted in a normal first position in the path of movement of the articles for actuation by an article to a second position when the article reaches a predetermined location on the conveyor unit, means for interconnecting said drive wheel and said control element associated with each of said conveyor units for movement together to and from said first positions and said second positions, means for urging said interconnecting means in one direction to yieldably maintain said drive wheels and said control elements in said first positions, and means for rotating said drive wheels.

4. An apparatus for conveying articles comprising a plurality of rollers, frame means for supporting the rollers in a row in laterally spaced relation to each other for rotation about their axes, means for interconnecting the rollers of successive groups of rollers for rotation together to form a plurality of conveyor units in adjacent relation one to another, drive wheels individual to said conveyor units, means on said frame means for supporting each of said drive wheels for movement to an operative position in operative engagement with one end of the conveyor unit associated therewith and one end of the preceding conveyor unit and to an unoperative position disengaged from said conveyor units, control rollers individual to said conveyor units, means for mounting one of said control rollers adjacent to the other end of each of said conveyor units for movement to a normal first position in the path of movement of the articles for actuation thereby to a second position, means for interconnecting said drive wheel and said control roller of each of said conveyor units for movement together from one position to another so that in response to movement of the control roller to its second position by an article the associated drive wheel is moved to the unoperative position, and means for urging said drive wheels individually to said operative positions and said control rollers associated therewith to said first positions.

5. Article advancing apparatus comprising a plurality of conveyors mounted in a row in adjacent relation to one another for advancing articles along a predetermined path, a control element for each of said conveyors mounted in a normal first position in the path of movement of the articles for actuation by an article to a second position when the article reaches a predetermined position on the conveyor, and means individual to said elements and rendered operative and unoperative in response to movement of said element to said first and said second positions respectively for driving the conveyor associated with said element and the adjacent preceding conveyor.

6. Article advancing apparatus comprising a plurality of conveyors mounted in a row in adjacent relation to one another for advancing articles from one conveyor to another along a predetermined path, elements individual to said conveyors mounted in a normal first position in the path of movement of the articles for actuation by an article to a second position when the article reaches a predetermined location on the conveyor, a main drive, drive means individual to said elements connected to said main drive for actuating the conveyor associated with the element and the adjacent preceding conveyor, and means individual to said elements for rendering the drive means associated therewith operative when said element is in said first position and for rendering said drive means unoperative when said control element is in said second position.

7. Article advancing apparatus comprising a plurality of conveyors mounted in adjacent relation to one another for advancing articles from one conveyor to another along a predetermined path, means individual to said conveyors for driving a conveyor and the adjacent preceding conveyor, control means individual to said conveyors mounted for actuation by an article when the article reaches a predetermined position on the conveyor, and means responsive to the actuation of said control means for rendering unoperative the drive means associated with said conveyor.

8. An apparatus for advancing articles comprising a plurality of rollers mounted in a row in laterally spaced relation to each other for supporting articles thereon for movement along a predetermined path, means for interconnecting the rollers of successive groups or rollers for rotation together to form a plurality of conveyor units, means individual to said conveyor units for driving a conveyor unit and the adjacent preceding conveyor unit, control means individual to said conveyor units mounted for actuation by an article when the article reaches a predetermined position on a conveyor unit, and means responsive to the actuation of said control means for rendering the drive means associated with said conveyor unit unoperative.

9. An apparatus for advancing articles comprising a plurality of rollers, means for rotatably supporting said rollers in a row in laterally spaced relation to each other for movement of the articles thereon along a predetermined path, means for interconnecting the rollers of successive groups of rollers for rotation together to form a plurality of conveyor units, a control element for each of said conveyor units mounted in a normal first position in the path of movement of the articles for actuation by an article to a second position when the article reaches a predetermined position on the conveyor unit, and means individual to said elements rendered operative and unoperative in response to movement of said element to said first and said second positions for driving the conveyor associated with said element and the adjacent preceding conveyor.

References Cited in the file of this patent
UNITED STATES PATENTS

| | | |
|---|---|---|
| 1,430,766 | Stebler | Oct. 3, 1922 |
| 1,882,317 | Cornell | Oct. 11, 1932 |
| 2,496,548 | Rosa | Feb. 7, 1950 |
| 2,553,719 | Palmer | May 22, 1951 |
| 2,787,364 | Beck | Apr. 2, 1957 |
| 2,992,721 | Eger | July 18, 1961 |